United States Patent
Koch et al.

(10) Patent No.: US 11,846,362 B2
(45) Date of Patent: Dec. 19, 2023

(54) SOLENOID VALVE

(71) Applicant: Aventics GmbH, Laatzen (DE)

(72) Inventors: Jens Koch, Hannover (DE); Konstantin May, Hildesheim (DE)

(73) Assignee: Aventics GmbH, Laatzen (DE)

( * ) Notice: Subject to any disclaimer, the term of this patent is extended or adjusted under 35 U.S.C. 154(b) by 74 days.

(21) Appl. No.: 17/624,623

(22) PCT Filed: Jul. 3, 2020

(86) PCT No.: PCT/DE2020/100592
§ 371 (c)(1),
(2) Date: Jan. 4, 2022

(87) PCT Pub. No.: WO2021/001000
PCT Pub. Date: Jan. 7, 2021

(65) Prior Publication Data
US 2022/0252175 A1 Aug. 11, 2022

(30) Foreign Application Priority Data

Jul. 4, 2019 (DE) ...................... 10 2019 004 597.1

(51) Int. Cl.
*F16K 27/02* (2006.01)
*F16K 31/06* (2006.01)

(52) U.S. Cl.
CPC ........ *F16K 27/029* (2013.01); *F16K 31/0655* (2013.01); *F16K 31/0696* (2013.01)

(58) Field of Classification Search
CPC ............... F16K 27/029; F16K 31/0655; F16K 31/0696; F16K 31/0675
See application file for complete search history.

(56) References Cited

U.S. PATENT DOCUMENTS 4,240,468 A   12/1980  Brand et al.
4,523,739 A    6/1985  Johansen et al.
4,526,340 A *  7/1985  Kolchinsky ........... F16K 31/408
                                                    251/38

(Continued)

FOREIGN PATENT DOCUMENTS

DE    1 797 854 U    10/1959
DE   33 22 844 A1    12/1983

(Continued)

OTHER PUBLICATIONS

International Search Report corresponding to PCT Application No. PCT/DE2020/100592, dated Sep. 23, 2020 (German and English language document) (6 pages).

*Primary Examiner* — Matthew W Jellett
(74) *Attorney, Agent, or Firm* — Maginot, Moore & Beck LLP

(57) ABSTRACT

The disclosure relates to a solenoid valve comprising a housing body made of a thermoplastic, a coil, and a metal yoke which is at least partly arranged about the coil, wherein the housing body is designed as an injection molded part which surrounds the coil, and electrically insulating additives are added to the thermoplastic in order to increase the thermal conductivity thereof. The housing body is formed with grooves on the housing body exterior, and the metal yoke is designed as a component which partly surrounds the housing body and is mechanically connected to same.

11 Claims, 3 Drawing Sheets

(56) References Cited

U.S. PATENT DOCUMENTS

| | | | |
|---|---|---|---|
| 5,710,475 A | 1/1998 | Irwin et al. | |
| 6,073,904 A | 6/2000 | Diller et al. | |
| 9,406,426 B2 * | 8/2016 | Gruener | H01F 7/1607 |
| 10,753,503 B2 * | 8/2020 | Ramler | F16K 31/0655 |
| 2007/0007477 A1 | 1/2007 | Hamada et al. | |

FOREIGN PATENT DOCUMENTS

| | | |
|---|---|---|
| DE | 10 2010 042 069 A1 | 4/2012 |
| EP | 0 615 088 B1 | 10/1997 |

\* cited by examiner

SOLENOID VALVE

This application is a 35 U.S.C. § 371 National Stage Application of PCT/DE2020/100592, filed on Jul. 3, 2020, which claims the benefit of priority to Serial No. DE 10 2019 004 597.1, filed on Jul. 4, 2019 in Germany, the disclosures of which are incorporated herein by reference in their entirety.

The invention disclosure relates to a solenoid valve.

BACKGROUND

Solenoid valves known in the prior art have a coil having an anchoring means which is supported inside the coil so as to be axially movable with respect to a resilient load, a metal yoke which engages around the coil and a housing which surrounds the arrangement. The housing serves to electrically insulate and protect the magnet arrangement from external influences and is to this end formed from an electrically non-conductive material, for example, a plastics material. Such solenoid valves known in the prior art are used, for example, as electrically activated preliminary stages for pneumatic directional control valves (solenoid pilot valve), wherein the anchoring means is formed, for example, with sealing means for a corresponding sealing seat for a gaseous or liquid fluid or acts on a separate adjustment element with a sealing means to which it is physically or functionally connected.

There are market requirements to construct such solenoid valves to be as small as possible with at the same time the highest possible throughflow. In this instance, there is a conflict of objectives between required relatively high switching and closing forces, on the one hand, and the resultant relatively high temperatures, on the other hand, which are produced during operation as a result of the required switching and closing forces arising from the introduction of heat by the electrical power required for this purpose in the coil winding with a relatively small structural shape. The maximum electrical power which can be installed is limited by the maximum permissible temperature which is produced during operation in the state of equilibrium between the heat input as a result of the electrical power and the heat dissipation via the coil surface and the housing surface of the solenoid valve to the surrounding atmosphere. For the reasons mentioned, the most effective possible dissipation of heat via the surface of the electrically insulating housing of the solenoid valve to the surrounding atmosphere is desirable.

DE 1 797 854 U discloses a housing for solenoid valves used for the activation of valves, comprising a coil and a sheet bundle which surrounds it and which is produced from a cast resin (Duroplast) and which is provided at the outer side thereof with cooling ribs in order to significantly increase the heat dissipation surface. In order to improve the heat dissipation, it is further proposed to add thermally conductive fillers to the cast resin. The production of a valve housing with a resin in a casting process is relatively time-consuming. Typical cast resins further have after their curing a relatively brittle material composition, whereby, as a result of the correct heat input, they are subjected to a relatively powerful material ageing. The adhesive connection of the cast resin to the planar interfaces with respect to the sheet bundle which surrounds the coil may in this instance as a result of the different thermal expansion coefficients of the two materials lead to tension-related crack formations in the cast resin body.

DE 33 22 844 A1 discloses a housing for a solenoid valve which is provided with a valve member with the cartridge construction type and which comprises an injection-molded component made of synthetic resin which surrounds the valve construction and which can be configured at the outer side thereof with a rib-like structure. In this instance, a solenoid coil is carried in a coil member which is secured in a tubular frame which is encapsulated in an outer body which is formed from a suitable synthetic resin. Conventional synthetic resins have only limited thermal conductivity, whereby the heat dissipation which can be achieved over the surface of the synthetic resin housing is limited accordingly. Furthermore, the injection-molded connection of the synthetic resin housing to the tubular frame of the coil member on the planar interfaces is also usually adhesive, whereby, as a result of the different thermal expansion coefficients of the synthetic resin and the frame, tension-related crack formations in the synthetic resin body may occur.

EP 0 615 088 B1 discloses a valve device with an electrically actuatable solenoid valve which acts as a pre-control valve and which has a valve housing in which a magnet coil is arranged, and which has an outer face which faces the environment and on which at least in the region of the magnet coil a plurality of cooling ribs which are separated from each other by means of intermediate spaces are provided, wherein the intermediate spaces provided between the cooling ribs are open at the end side. The cooling ribs serve to increase the air gap provided for the air flow and consequently serve to improve heat dissipation by means of convection. The housing portion which is configured with cooling ribs may be configured as a plastics material component. Conventional plastics materials have only limited thermal conductivity, whereby the heat dissipation which can be achieved over the surface of the plastics material housing is accordingly limited. Technical methods for producing or connecting the plastics material component of the valve housing to the magnet coil are not disclosed by EP 0 615 088 B1.

SUMMARY

An object of the disclosure is to avoid the disadvantages mentioned. In particular, there is intended to be provided a solenoid valve which has an effective heat dissipation to the surrounding atmosphere and which enables the production of relatively small solenoid valves with at the same time relatively high switching and closing forces.

The object is achieved according to the disclosure with a solenoid valve according to claim 1. Advantageous developments of the disclosure are set out in the dependent claims.

The central notion of the disclosure is formed by a solenoid valve which comprises a housing body which is formed from a thermoplastic plastics material, a coil and a metal yoke which at least partially engages round the coil, wherein the housing body is configured as an injection-molded component which surrounds the coil, electrically insulating additives are added to the thermoplastic plastics material in order to improve its thermal conductivity and the housing body is formed at the outer side thereof with ribs, and wherein the metal yoke is configured as a component which partially engages round the housing body and is mechanically connected thereto. With the housing body which is formed from a thermoplastic plastics material body, by adding additives with an increased thermal conductivity and by the simultaneous formation of ribs which increase the surface for heat dissipation to the surrounding atmosphere on the outer side of the housing body, an effective heat dissipation is ensured. There can be used as additives any materials which are suitable for processing with plastics material and which have only an extremely low electrical conductivity (insulator) which is comparable with plastics materials, but which at the same time have a significantly increased thermal conductivity compared with the plastics material used. This enables the production of relatively small solenoid valves with at the same time a relatively high electrical power, whereby comparatively high switching and closing forces can be produced again. As a result of the configuration of the housing body as an injection-molded component, the solenoid valve can be produced in a structurally simple and cost-effective manner. By the metal yoke not directly engaging around the coil, but instead being configured as a component which partially engages round the housing body from the outer side and which is connected to the housing body in a purely mechanical manner, at the same time tension-related cracks in the housing body as a result of different thermal expansion coefficients of the two components are prevented since the metal yoke has on the planar interfaces thereof no adhesive connection to the plastics material housing body. As a result of the purely mechanical connection between the metal yoke which is arranged at the outer side and the housing body which directly surrounds the coil, minimal heat-related relative movements between the metal yoke and the housing body are enabled. At the interfaces between the plastics material housing body and the coil, however, no comparable tension moments are produced since the coil at the outer side thereof formed by the coil winding has no comparable planar interfaces with respect to the injection-molded component which surrounds it. As a result of the disclosure, a solenoid valve with an increased installable power with consistent spatial dimensions is provided.

A particularly good thermal conductivity between the coil and the housing body is ensured by the housing body being formed as an integral component directly on the coil. This enables at the same time a simple and cost-effective production.

In an advantageous embodiment, the metal yoke engages round the housing body in a U-shaped manner or as a longitudinally sectioned, partially hollow cylinder.

For the structurally simple embodiment of the mechanical connection which can be produced in a cost-effective manner, the metal yoke is mechanically connected to the housing body by means of at least one screw connection which is formed between flanks or members which engage round the housing body.

Mineral and/or inorganic solids can be used as additives which can be processed in a particularly simple manner. Solid additives which are commercially available in a particularly cost-effective manner with good properties are boron nitrite and/or aluminum oxide.

Coils for solenoid valves are generally formed from an inner carrier element and an external coil winding, for example, made from copper. By the carrier element also being formed in this instance from a plastics material having thermal conductivity which has been increased by means of electrically insulating additives, an additionally improved heat dissipation via the carrier element is ensured at the same time.

By one or more elastomer elements being arranged between the housing body and the metal yoke which partially engages round it, an additionally improved freedom of movement between the housing body and metal yoke is achieved and possible tensions during operation are further reduced.

BRIEF DESCRIPTION OF THE DRAWINGS

Other advantages of the disclosure are illustrated in greater detail below together with the description of a preferred embodiment of the disclosure with reference to the Figures, in which.

DETAILED DESCRIPTION

Figure 1:
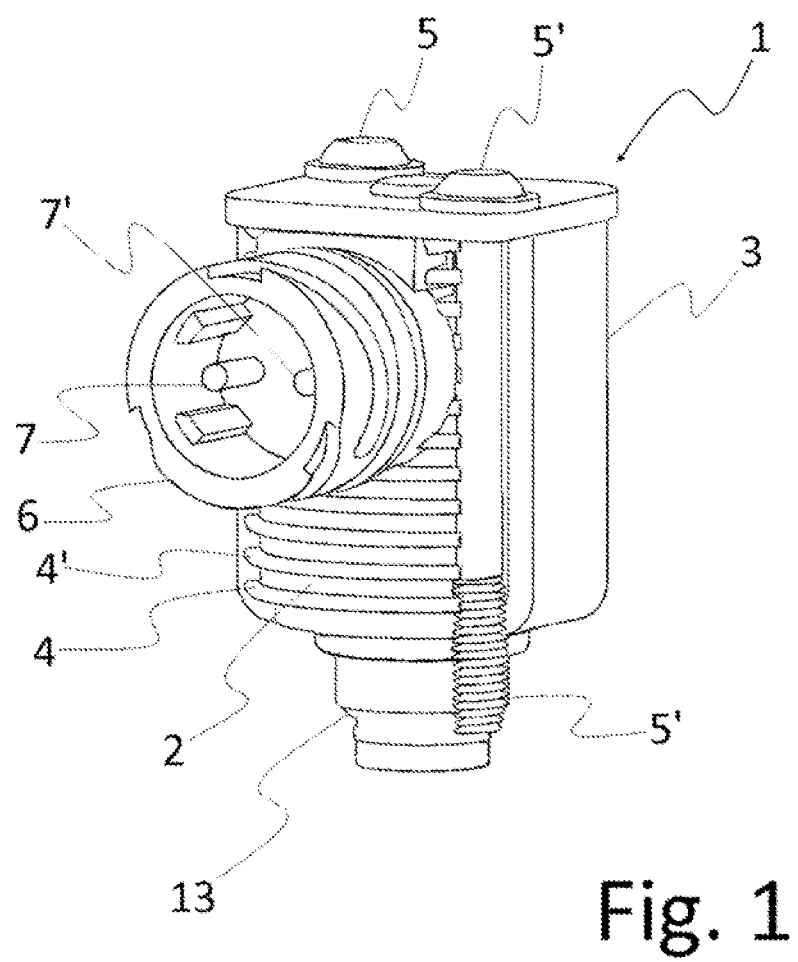
FIG. 1 is a perspective front view of a solenoid valve.
Figure 2:
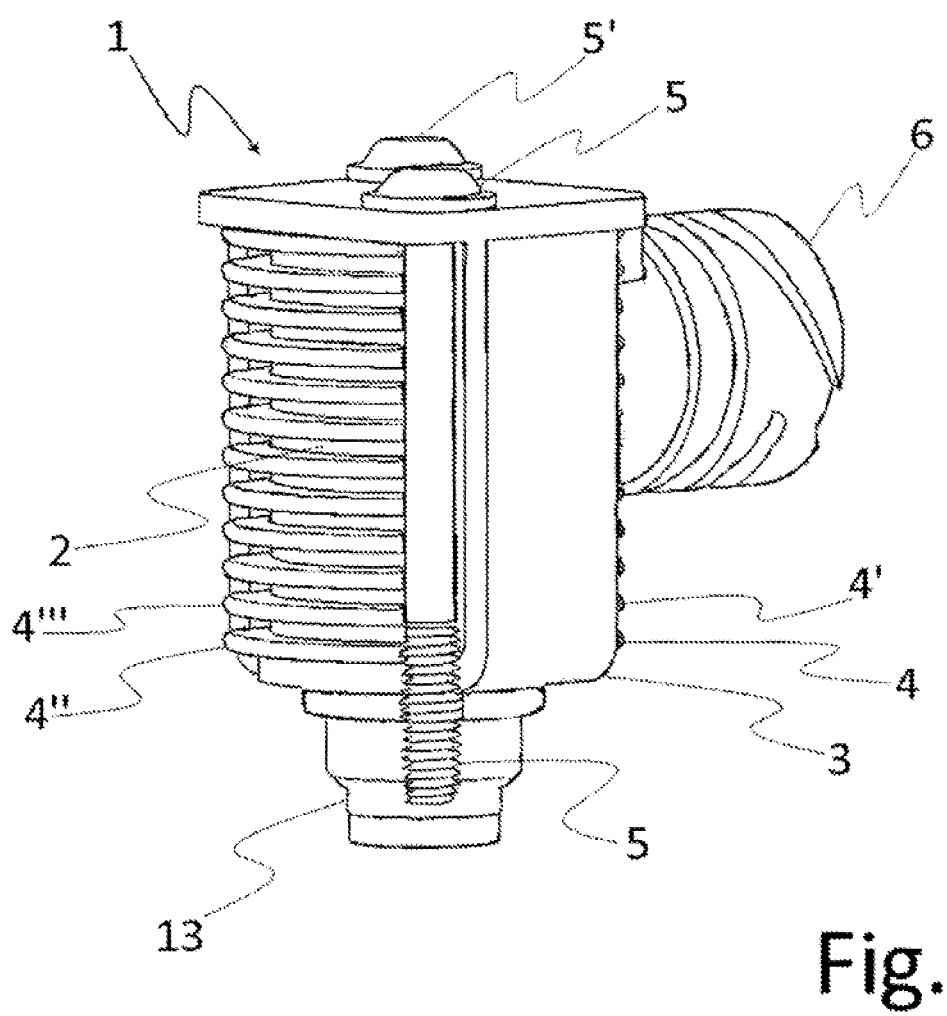
FIG. 2 is another perspective illustration of the solenoid valve according to FIG. 1.
Figure 3:
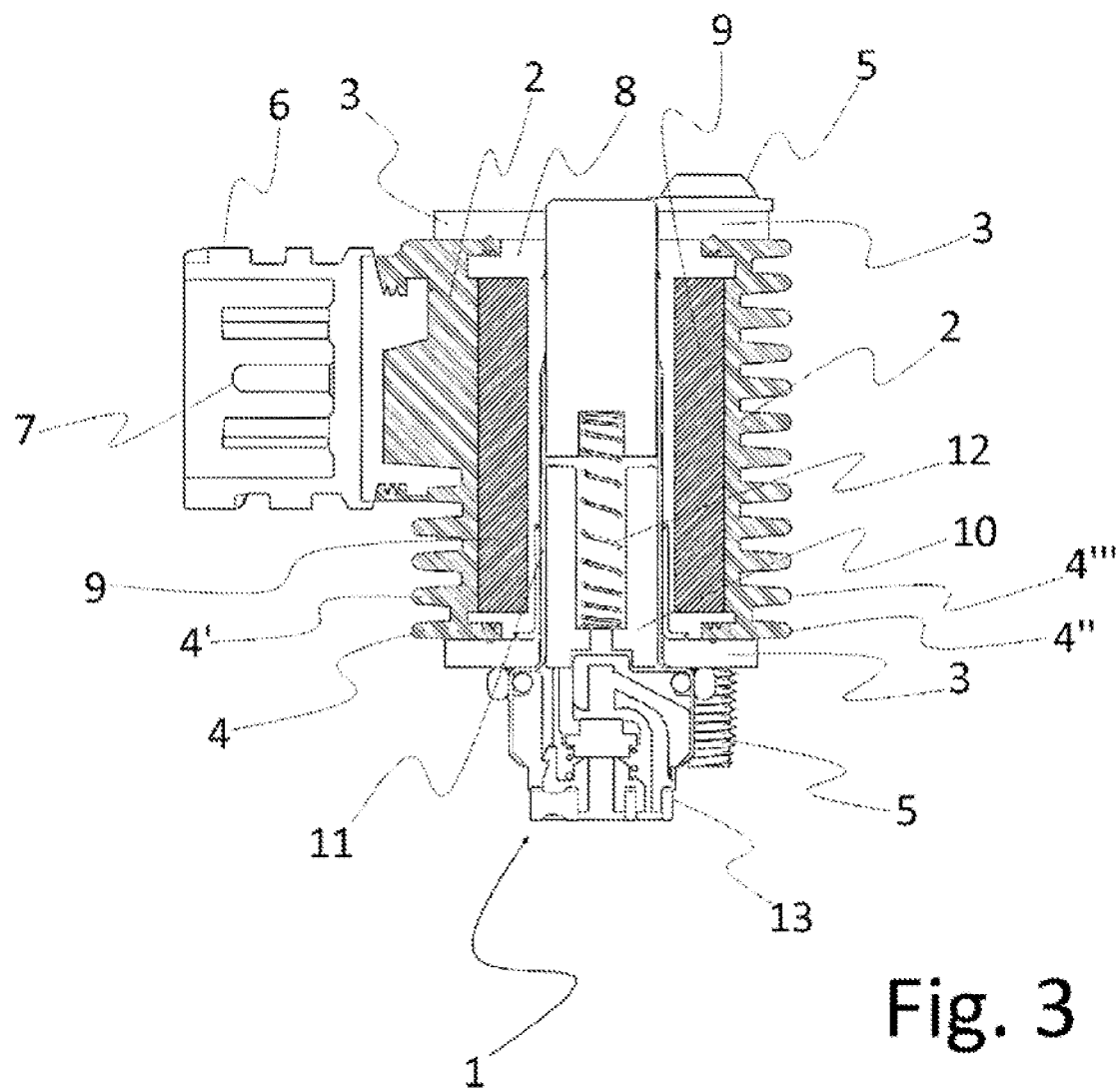
FIG. 3 is a schematic longitudinally sectioned illustration of the solenoid valve according to FIG. 1.

FIG. 1 and FIG. 2 show the solenoid valve 1 as a perspective front and rear view. The solenoid valve 1 has a housing body 2 which is formed from a thermoplastic plastics material and a metal yoke 3 which partially engages round the housing body 2. The housing body 2 is provided on the outer side thereof with a rib structure which increases the surface for convective heat dissipation to the surrounding atmosphere and of which in FIG. 1 to FIG. 3, in order to maintain the clarity, only the individual ribs 4, 4', 4" and 4'" are provided by way of example with reference numerals. The metal yoke 3 is connected to the housing body 2 in a non-positive-locking manner by means of the screws 5 and 5'. The housing body 2 is formed at the front side thereof with the hollow-cylindrical connection base 6 in which electrical contact pins 7 and 7' are arranged. The connection base 6 serves to receive a corresponding plug type connection means in order to produce an electrical connection of the coil to a power supply. FIG. 3 is a schematic longitudinal section through the solenoid valve 1. The coil winding 9 is carried on the coil carrier 8. Within a central cylindrical recess of the coil carrier 8 the tubular magnet armature 10 is guided so as to be axially movable inside the guiding sleeve 11. When the coil is electrically activated, the magnet armature 10 moves counter to the force of the spring in an upward direction, whereby a fluid connection can be released in the pneumatic valve portion 13. The housing body 2 is formed from a thermoplastic plastics material and configured as an injection-molded component which directly engages round the coil. In order to produce the housing body 2, the coil is injected directly with the thermoplastic plastics material and the housing body 2 is consequently formed directly in an integral manner on the coil. With this method of production, a particularly good thermal conduction between the coil and the housing body 2 is ensured since an optimum positive-locking connection without gaps is produced between the thermoplastic material of the housing body 2. In this instance, in order to improve the thermal conductivity thereof, electrically insulating additives with at the same time a significantly increased thermal conductivity compared with the plastics material are added to the thermoplastic plastics material, which improves the discharge of the heat from the coil winding 9 via the housing body 2 to the atmosphere surrounding it. By the metal yoke 3 engaging round the housing body 2 which is formed from plastics material from the outer side and being connected thereto only in a mechanically non-positive-locking manner, relative movements between the metal yoke 3 and the housing body 2 are enabled in the event of temperature changes, whereby mechanical damage to the housing body is prevented. The solenoid valve 1 enables the installation of a relatively higher power with the same structural size compared with the constructions known from the prior art.

LIST OF REFERENCE NUMERALS

1 Solenoid valve
2 Housing body
3 Metal yoke
4, 4', 4", 4''' Rib
5, 5' Screw
6 Connection base
7, 7' Contact pin
8 Coil carrier
9 Coil winding
10 Magnet armature
11 Guiding sleeve
12 Spring
13 Valve portion

The invention claimed is:

1. A solenoid valve comprising:
    a housing body formed from a thermoplastic plastics material and defining a plurality of ribs formed at an outer side of the housing body;
    a coil located within the housing body and positioned directly against the housing body; and
    a metal yoke arranged at least partially around the housing body, the metal yoke mechanically connected to the housing body,
    wherein the housing body is configured as an injection-molded component, and
    wherein electrically insulating additives are added to the thermoplastic plastics material to increase a thermal conductivity of the housing body.

2. The solenoid valve as claimed in claim 1, wherein the housing body is formed as an integral component directly on the coil.

3. The solenoid valve as claimed in claim 1, wherein the metal yoke engages the housing body in a U-shaped manner or as a longitudinally sectioned, partially hollow cylinder.

4. The solenoid valve as claimed in claim 1, wherein:
    the metal yoke is mechanically connected to the housing body by at least one screw that extends between flanks of the metal yoke, and
    the housing body and the coil are located at least partially between the flanks of the metal yoke.

5. The solenoid valve as claimed in claim 1, wherein the electrically insulating additives are mineral and/or inorganic solid materials.

6. The solenoid valve as claimed in claim 5, wherein the additives are boron nitrite and/or aluminum oxide.

7. The solenoid valve as claimed in claim 1, wherein:
    the coil comprises an inner carrier element and an external coil winding, and
    the inner carrier element is formed from a plastics material having a thermal conductivity which is increased by additional electrically insulating additives.

8. The solenoid valve as claimed in claim 1, further comprising:
    one or more elastomer elements arranged between the housing body and the metal yoke.

9. The solenoid valve as claimed in claim 1, wherein the metal yoke has no adhesive connection to the housing body at planar interfaces between the metal yoke and the housing body.

10. The solenoid valve as claimed in claim 1, wherein the plurality of ribs are exposed to a surrounding atmosphere to dissipate heat from the coil.

11. The solenoid valve as claimed in claim 1, wherein:
    the metal yoke is U-shaped and includes spaced apart metal flanks,
    the housing body is located between the metal flanks,
    a screw extends through the metal flanks to connect the housing body to the metal yoke,
    planar interfaces are defined between each of the metal flanks and corresponding opposite sides of the housing body, and
    the metal yoke has no adhesive connection to the housing body at the planar interfaces.

* * * * *